United States Patent [19]

Thompson

[11] 4,255,711

[45] Mar. 10, 1981

[54] COIL ARRANGEMENT FOR SEARCH HEAD OF A METAL DETECTOR

[75] Inventor: Fredrick H. Thompson, Forest Grove, Oreg.

[73] Assignee: Compass Electronics Corporation, Forest Grove, Oreg.

[21] Appl. No.: 39,175

[22] Filed: May 15, 1979

[51] Int. Cl.³ .............................................. G01V 3/08
[52] U.S. Cl. .................................................. 324/329
[58] Field of Search ................ 324/329, 339, 239–241

[56] References Cited

U.S. PATENT DOCUMENTS

| | | | |
|---|---|---|---|
| 2,547,407 | 4/1951 | Nelson | 324/329 |
| 2,557,994 | 6/1951 | Ostland | 324/329 |
| 3,471,773 | 10/1969 | Penland | 324/329 |

*Primary Examiner*—Michael J. Tokar
*Attorney, Agent, or Firm*—Chernoff & Vilhauer

[57] ABSTRACT

A unitary balanced-inductor system for use in the search head of an electronic metal detector, having a transmit coil, a smaller, preferably concentric cancel coil of opposite polarity, and a yet smaller receive coil inductively decoupled from the combined transmit and cancel coils. The cancel coil preferably has a smaller number of turns and is located in a slightly higher plane than is the transmit coil, while the receive coil may be placed in a slightly lower plane than the transmit coil, to provide adequate sensitivity to the presence of conductive or magnetic objects separated from the search head without unacceptably high sensitivity to similar objects relatively close to the search head. A closed loop load coil located between portions of the transmit coil and the cancel coil may be used to provide an inductive load on the transmit coil thereby further reducing the sensitivity of the search head to targets in close proximity to the load coil.

14 Claims, 8 Drawing Figures

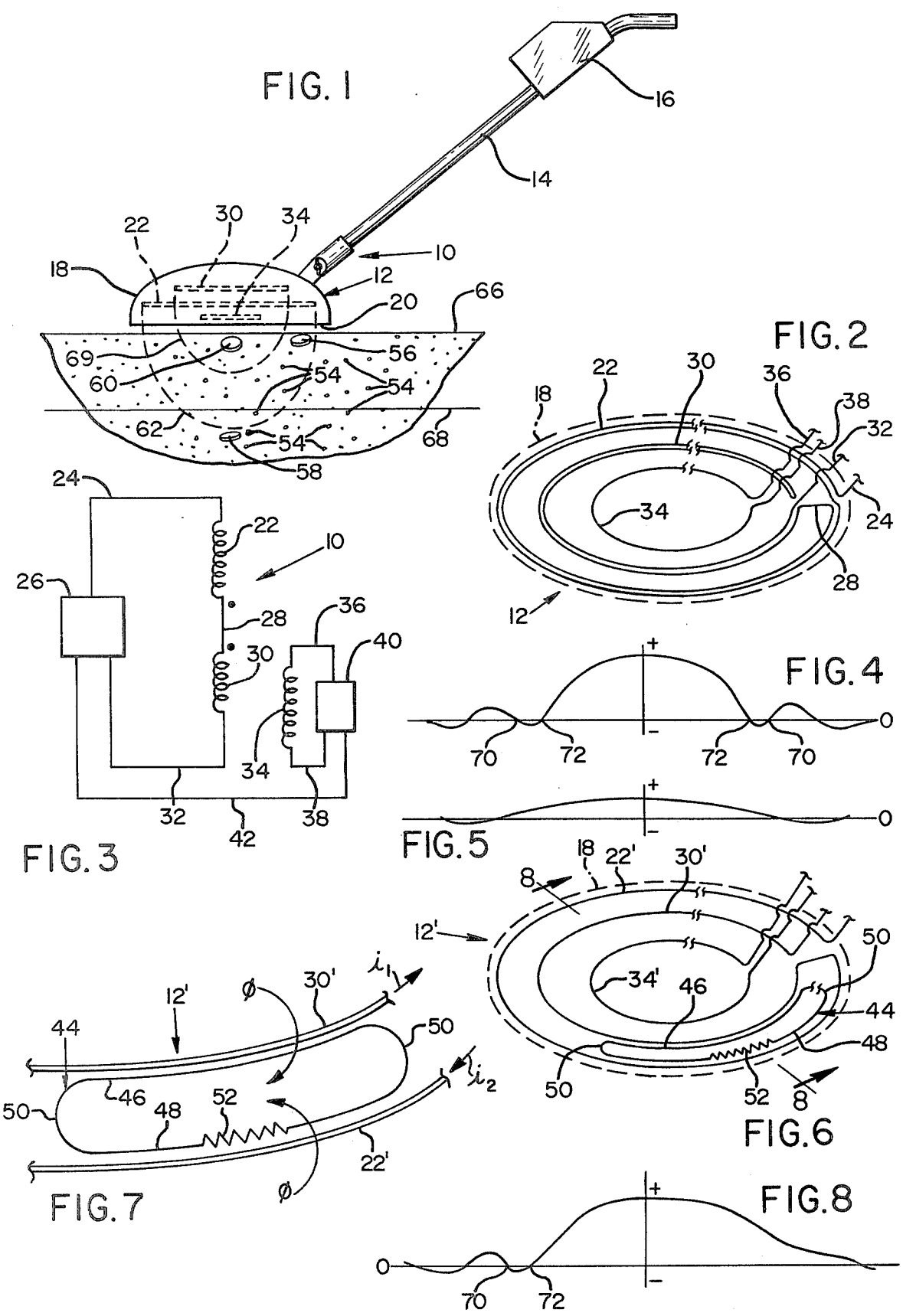

COIL ARRANGEMENT FOR SEARCH HEAD OF A METAL DETECTOR

BACKGROUND OF THE INVENTION

This invention relates to metal detection equipment and particularly to the arrangement of inductor coils in a search head for a metal detector.

Commonly known electronic metal detectors have a unitary search head having one or more inductor coils and means for providing a time-varying magnetic field. Detection of a conductive or magnetic object generally depends on a change in the voltages induced in a receive coil by a transmit coil of the search head, the change in voltage being caused by a change in the mutual induction between the transmit and receive coils when an object enters the field of the transmit coil.

Metal detectors typically include a signal generator which supplies a sinusoidally time-varying voltage to a transmit coil to produce a time-varying electromagnetic field which typically may be unmodulated, amplitude-modulated, or pulsed. Usually a receive coil, which may include two portions of opposing polarity located in a known spatial relationship to the position of the transmit coil, is connected to a detector circuit which amplifies and evaluates the voltage, if any, induced within the receive coil by the transmit coil. The presence of any conductive or magnetic material within the changing flux field of the transmit coil alters the basic relationship between the transmit coil and the receive coil, causing a detectable change in the voltage induced in the receive coil.

it is common in the search head of such metal detectors for a receive coil or coils to be located overlapping a larger annular transmit coil, in a spatial relationship with the larger coil such that the receive coils are in null positions relative to the fluctuating magnetic field of the transmit coil in air. The presence of nearby metallic or magnetic objects causes anomalies in the shape of the flux field of the transmit coil, thus causing voltages to be induced in the receive coil or coils.

In more sophisticated electronic metal detectors the phase relationship between the transmitted signal and the voltage induced in the receive coil may be determined and used to help identify the object which has altered the normal electromagnetic flux pattern. When a conductive metallic object is within the field, the changing magnetic field of the transmit coil generates, within the object, eddy currents whose characteristics depend on the size, shape and material of the object. These eddy currents are out of phase with the current in the transmit coil, and the eddy currents themselves produce magnetic fields which are detectable as anomalies in the net magnetic field in the vicinity of the metal detector search head.

Non-conductive magnetic materials in the vicinity of the search head also cause anomalies in the magnetic field which produce detectable changes in the current in the receive coil, because of the hysteresis of thier induced magnetism produced by the time lag for rotation of magnetic dipoles of the material in response to the transmit coil's changing field. The phase relationship between the transmitted signal and the detectable current induced in the receive coil resulting from these phenomena characterize the object which has caused an anomaly in the magnetic flux pattern.

A problem in previously known electronic metal detectors is that in order to increase the sensitivity of a metal detector to the presence of desirable target objects, such as coils, rings, watches, and jewelry, it has been necessary to increase the strength and the size of the magnetic field of the transmit coil. Since the strength of the field established by a particular coil decreases rapidly with increasing distance from the coil, a field which can be used to detect distant objects is considerably stronger near the transmit coil than is necessary to detect nearby objects. As a result, in order to detect the very weak responses induced in the receive coil by distant targets, it has been necessary to use associated receiver and detection circuitry which has a very wide dynamic range in order to avoid overloading of the detection circuitry by the response of nearby objects. While numerous arrangements of transmit and receive coils have been disclosed by the prior art, all of those configurations are subject to the limitation that the sensitivity required to detect distant targets results in excessive sensitivity to nearby targets.

An obstacle often encountered while using electronic metal detectors to detect desirable targets such as coins, rings, and the like is that unwanted magnetic materials occur in an area being searched, either as native mineral deposits or as the remnants of completely corroded iron objects which are normally of no interest. By the use of an electronic phase analysis technique the receiver circuitry of a metal detector may be made non-responsive to the distributed non-conductive magnetic particles in the ground while maintaining a high sensitivity to conductive targets, providing an ability to ignore the response of the receive coil to the presence of such distributed magnetic material.

Another problem in the use of previously known metal detector search coil arrangements in conjunction with such phase analyzing circuitry is that, for targets very close to the surface over which the detector search head is moved, as the conductors of a transmit coil pass over a metallic target or a magnetic mineral particle the induced response signal in the receive coil may undergo a change in its phase relationship to the signal applied to the transmit coil because the vertical component of the magnetic field inside the transmit coil is opposite to the vertical component outside the coil.

In a search head having multiple transmit coils of different polarities such phase changes may be greater or may be separately associated with each transmit coil of the search head. In electronic metal detectors which include circuitry designed to identify response-producing objects by evaluation of the phase relationship between the transmitted signal and a received response, such a changing response to shallow or close-by objects may confuse the target identification circuitry. With such confusion an undesirable object detected by such a search head may cause an indication of the presence of a desirable object, resulting in search time wasted in locating a worthless object.

Known metal detector search head coil arrangements designed to provide improved sensitivity to the presence of desired target objects include McDaniel U.S. Pat. No. 3,882,374, Wheeler U.S. Pat. No. 2,451,596, and Penland U.S. Pat. No. 3,471,773. The McDaniel patent discloses an inductor arrangement in which three coplanar, concentric coils form a balanced inductor system. A transmit coil is located concentrically within one receive coil and a second receive coil is concentrically located within the transmit coil. The two receive coils are connected in series opposition and balanced by varying the size of the transmit coil, and by adjusting the number of turns in the inner receive coil, so that there is an inductive linkage between the transmit coil and each one of the receive coils alone, but a net decoupling of the transmit coil from the combined opposing receiving coils occurs in the absence of magnetic or conductive materials. As the search head approaches such materials, however, the receive coil response increases very rapidly, and thus an associated detection circuit may be overloaded by the receive coil response to magnetic minerals, preventing detection of desirable objects.

Wheeler U.S. Pat. No. 2,451,596 discloses a coaxial, coplanar arrangement of three coils in which a first coil has the largest diameter, and a second coil, connected in series opposition to the first coil, is the smallest of the three, these first and second coils being transmit coils. A third, receive, coil of intermediate size is located in a coaxial coplanar relationship with the first two, the sizes and numbers of turns of the three coils being chosen to produce substantially zero inductive coupling of the third coil to the first and second coils. In another coil arrangement disclosed by Wheeler the relative positions of the coils need not be coplanar so long as the third coil is located in the surface of a sphere of "zero normal component of magnetic-field intensity", or "neutral sphere", thus being somewhat decoupled from the combined fields of the first and second coils. According to Wheeler the first transmit coil will have no more turns, and generally fewer turns than the opposing and smaller second transmit coil.

The coplanar arrangement disclosed by Wheeler would produce a relatively rapid increase in strength of response to a target as the distance between the target and the search head decreases. An additional disadvantage of the Wheeler coil arrangement is that because of the separation between the opposing transmit coils of the Wheeler patent an apparent change in phase relationship between the signal applied to the transmit coil and the response to the object induced in the receive coil may occur as the search head moves over an object, which would cause difficulty in identification by evaluation of response phase angles.

Penland U.S. Pat. No. 3,471,773 discloses a search head coil arrangement in which a relatively large diameter transmit coil includes a smaller loop of opposite polarity and equal number of conductor turns which extends inwardly from the circumference of the transmit coil. A small receive coil is located slightly below the plane of the transmit coil, overlapping the small opposite polarity loop so that the receive coil is near a null position relative to the combined transmit coil loops. The inwardly protruding loop decouples the receive coil from the transmit coil and produces low receive coil output in the presence of non-metallic objects or undesirable metallic objects. While this coil arrangement provides good sensitivity to desired objects, the Penland device, like those of McDaniel and Wheeler, is subject to the problem of over-sensitivity to presence of detectable objects very close to the search head, and because of the asymmetry of the coil arrangement of Penland, target identification circuitry associated with the Penland search head may have to deal with different phase responses to the same target in different positions relative to the search head. Additionally, while the Penland coil system is balanced to a near zero receive coil current in the absence of magnetic or metallic material, it becomes unbalanced and therefore less sensitive to desirable metallic objects when operating in an environment containing unevenly distributed magnetic minerals.

Another problem with many prior art search heads such as that of Penland is that, because of asymmetrical construction, variations in ambient temperature where the search head is used may cause imbalance among search head components.

What is needed, therefore, is a metal detector search head coil configuration which provides sensitivity to the presence of metallic or magnetic objects distant from the search head, despite the presence of nearby magnetic minerals, and which has sensitivity to nearby objects which is not so great that nearby objects can overload receiving and detection circuity. Also, any change in phase relationship between the transmitted signal and the received response signal as the search head passes over a target object should be small enough that characteristic phase relationships produced by certain types of targets may be used for their identification. Moreover, the search head should not be adversely affected by changes in ambient temperature.

SUMMARY OF THE INVENTION

The present invention overcomes the disadvantages and drawbacks of prior art electronic metal detector search head coil arrangements by providing a symmetrical inductor coil arrangement for a metal detector search head having adequate sensitivity to deep objects and in which sensitivity increases slowly enough with decreasing separation between a conductive or magnetic target object and the search head so that response to nearby objects does not overload target detection and identification circuits.

The coil arrangement of the invention comprises a planar transmit coil, a slightly smaller planar cancel coil of opposing polarity preferably arranged coaxially and in a plane parallel to that of the transmit coil, and a receive coil, of smaller diameter than the cancel coil, which is preferably also coaxial with the transmit coil. A conductive load plate or coil may also be included in the area between the cancel coil and the transmit coil.

In a basic embodiment of the invention, the transmit coil is a flat, annular winding of a number of closely spaced turns of a conductor, located in a plane parallel to the bottom of the search head so that it may be positioned close to the surface of an area of the ground which is to be searched. The cancel coil, preferably connected in series opposition to the transmit coil, is of like shape and slightly smaller diameter and ordinarily has fewer turns. The cancel coil is preferably coaxial with the transmit coil and located in a parallel plane a small distance above the transmit coil, for example, about one-half inch higher in the case of a 6½ inch transmit coil and a 5 inch cancel coil diameter. The opposing polarity of the cancel coil reduces the net magnetic field strength within the effective field of the cancel coil and close to the bottom surface of the search head by producing an equal or slightly weaker magnetic field opposing the field of the transmit coil. By using the appropriate location, size and number of turns in the cancel coil, the effective net magnetic field strength felt by an object close to the search head may be reduced greatly in comparison to the field of a similar transmit coil without such a cancel coil, and the search head including the cancel coil results in receive coil response which increases much less rapidly with approach to an object than for a detector coil system having no such cancel coil.

It is an imperical rule of thumb that the useful electromagnetic field of a given annular coil of such a metal detector is of a generally parabolic shape extending below the plane of the coil a distance approximately equal to the diameter of the coil and extending in the plane of the coil a relatively short distance beyond the coil. Thus the field of the transmit coil will extend to a greater depth than that of the somewhat smaller cancel coil, so that the field of the transmit coil, while opposed near the surface of the search head, will not be too greatly opposed by the cancel coil field at a greater depth, although strength and shape of the net field at any given depth are, naturally, affected by the strength of the field of the cancel coil. Therefore, the size and number of turns of the cancel coil are determined by compromise between the desired sensitivity for detection of deep targets and the desired limitation of sensitivity for shallow targets. Since the transmit and cancel coils are similar in shape, are only slightly different in size, and are symetrically arranged, operating temperature changes cause only negligible changes in search head balance.

The receive coil, of smaller diameter than the cancel coil, is positioned where it is inductively linked to each of the transmit and cancel coils but substantially decoupled from the net field of the transmit and cancel coils together, although this position may be varied slightly to improve receive coil response to conductive objects if appropriate nulling circuitry is associated with the receive coil. In a preferred embodiment of the invention the receive coil is coaxial with the transmit coil and located in a plane parallel with and slightly below the plane of the transmit coil. Dimensions of the receive coil, as is well known in the art, are determined by balancing the requirements for a high detection sensitivity, derived from a receive coil having a large enclosed area, and the precise location of detected objects, available with a small receive coil. In any case, the receive coil should be smaller than the cancel coil to realize its effects.

Compared to prior art metal detector search heads, such as that disclosed by Wheeler, the arrangement of coils according to the subject invention causes the strength of the response induced in the receive coil to increase at a much reduced rate of increase with decreasing distance to conductive or magnetic objects below the detector search head. Because of this lower sensitivity of the search head to close-by magnetic material, very sensitive detection circuits may be used without being overloaded by close-by magnetic mineral material, so that desired objects may be detected at greater depths despite the presence of mineral deposits in the soil, and identification of located objects may be determined from phase relationships between the transmitted signal and components of the response sensed by the receive coil.

This basic coil arrangement of the invention provides great improvement in ability to locate deep metallic targets despite the presence of magnetic mineral in the soil being searched. Nevertheless, the field of the cancel coil, opposing the field of the transmit coil, can in certain cases cause problems of identification of metallic targets located extremely close to the bottom of the search head, since such targets may sense a pair of phase reversals in the search head field distribution as the cancel coil conductors approach and pass above a target in such a location. Although the polarity of the cancel coil opposes that the transmit coil, their fields are mutually aiding in the ring-like space between the coils, yet a ring of opposite net magnetic field may be present immediately within and close to the conductors of the cancel coil. This problem may be greatly reduced by providing one or more closed loop current paths, in the form of a number of turns of wire, or even a flat conductive plate located closely adjacent to the outside of the cancel coil, to impose an inductively linked load on the transmit and cancel coils. Such a load coil, for instance an arcuate, elongate loop, comprising a pair of parallel concentrically curved conductors whose ends are connected to one another, has the effect of reducing the sensitivity of the receive coil to conductive or magnetic objects very close to one of the load coils. The load coils are effective only within a distance approximately equal to the distance between the parallel portions of the conductors, so that the load coils tend to reduce the sensitivity of the receive coil to detectable objects closer to the bottom of the search coil than the distance between the concentric arc segments of the conductors of the load coil. The load coil is thus helpful in reducing the sensitivity of the receive coil where a pocket of magnetic mineral matter has permeability great enough to cause saturation signals in receiver circuitry. Thus the receive coil, instead of seeing two reversals of polarity in the response of a target close to the bottom of the search head, will see only a reduction in the strength of the response, and target identification circuits will be more easily able to identify the target properly. For slightly deeper targets, load loops may be used to retard the phase of a target's response signal sufficiently to enhance phase angle measurement and thus aid target identification circuitry to identify the target properly.

By variation of the separation between the concentric arc segments of a closed loop load coil, the total area enclosed within the load coil, the number of turns of conductor forming the load coil, and the total electrical resistance of the load coil, the load coil's effects on the phase of a response to a nearby conductive or magnetic object may be controlled as desired to facilitate target identification. For example, increasing the resistance of a load reduces the maximum current induced in the coil and thus reduces its effect on the phase of the target response induced in the receive coil, while increasing the inductance of the load coil causes greater phase lag of target response as seen by the receive coil.

It is, therefore, a principal object of the present invention to provide an improved inductor coil configuration for the search head of an electronic metal detector.

It is another object of the present invention to provide a search head coil arrangement having sufficient sensitivity to detect objects at a relatively large distance from the detector search head, while maintaining an acceptably low sensitivity to the presence of magnetic or metallic objects very close to the search head.

It is a further object of the invention to provide a coil arrangement which is particularly useful in the detection of metallic objects in localities where there is an unusually high concentration of magnetic minerals in the soil.

It is an additional object of the invention to provide a new and improved inductor coil system in which the desired mutual coupling between the coils does not appreciably change with temperature and is not critical in respect to the shape of the inductors.

It is yet a further object of the invention to minimize undesirable changes in the phase of its output signal as a target object passes beneath the search head to facilitate identification of the object.

It is a principal feature of the present invention that it utilizes a metal detector search head having planar transmit and cancel coils of opposing polarity arranged parallel to one another, the transmit coil having a larger diameter than the cancel coil, and the cancel coil having a larger diameter than an associated planar receive coil which is disposed in a position parallel to the transmit and cancel coils but substantially decoupled from the combined fields thereof.

It is another feature of the invention that it utilizes a search head including one or more closed conductive loops which act as an inductive load on the transmit coils thereof to provide a desired phase relationship between the field of the transmit coil and the response of certain target objects.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a side view of an exemplary embodiment of a metal detector search head coil arrangement according to the present invention, shown incorporated in a metal detector.

FIG. 2 is a diagrammatic representation of a metal detector search head having a coil arrangement embodying the present invention.

FIG. 3 is a simplified schematic diagram of an exemplary circuit for use in a metal detector incorporating the invention.

FIG. 4 is a graphic representation of exemplary magnetic flux density distribution across the width of the search head of FIG. 2 at a shallow depth separation from the search head.

FIG. 5 is a graphic representation of an exemplary magnetic flux density distribution across the width of the search head of FIG. 2, at a greater depth separation from the search head.

FIG. 6 is a diagrammatic representation of a metal detector search head embodying the invention and including a closed loop load coil.

FIG. 7 is a fragmentary diagrammatic view of a search head including the load coil of FIG. 6, showing the direction of magnetic flux at a given instant.

FIG. 8 is a graphic representation of magnetic flux density distribution across the width of the search head of FIG. 6, at a shallow depth separation from the search head.

DETAILED DESCRIPTION OF THE INVENTION

Referring to the drawings, in FIG. 1 an exemplary metal detector 10 incorporating the coil arrangement of the invention is seen in a simplified side view. The metal detector comprises a search head 12, to which is attached a handle 14 of convenient length for supporting the search head in a position close to the surface of the ground, and an electronics package 16, which includes suitable power supply, control and indicator means, and is attached to the handle 14 in a position which provides convenient counterbalance to the weight of the search head 12 and allows the operator to easily observe visual indications of the detection of metallic or magnetic objects. The search head 12 comprises a search head housing 18 to provide suitable support for internal components, and preferably has a flat bottom side 20.

Referring now also to FIGS. 2 and 3 the inductor coil arrangement, which is contained in and supported by the inner structure of the search head housing 18, may be seen to comprise a transmit coil 22 comprising an annular winding of a number of closely-spaced turns of a suitable electrical conductor. A transmit coil conductor lead 24 connects one end of the transmit coil to a transmit signal generator 26 of a commonly known type, shown schematically in FIG. 3. An intercoil conductor 28 connects the opposite end of the transmit coil 22 to a cancel inductor coil 30 also comprised of a number of closely-spaced turns of a suitable electrical conductor, the cancel coil and transmit coil being wound in opposing magnetic polarities, as is indicated schematically in FIG. 3. A cancel coil conductor lead 32 connects the opposite end of the cancel coil 30 to the signal generator 26, completing a series circuit including the transmit coil 22 and the cancel coil 30.

The cancel coil 30 is of smaller diameter and normally includes fewer turns, and thus establishes a smaller and weaker magnetic field than does the transmit coil 22. The transmit coil and the cancel coil are preferably coaxial and may also be coplanar, although, for reasons which will be hereafter explained in connection with operation of the device, it is preferable to place the cancel coil farther than the transmit coil from the bottom side 20 of the search head. In a preferred embodiment the transmit coil has 100 closely spaced turns of 6.3 inch diameter, and the cancel coil has 90 closely spaced turns of 5 inch diameter, and is located about ½ inch above the transmit coil.

Located in a slightly lower plane than the transmit coil 22 is a receive coil 34 comprised of a number of turns of an electrical conductor connected by means of a pair of receive coil leads 36 and 38 to a detection circuit 40 which may be of any suitable type commonly known in the art. The receive coil 34 has a smaller diameter than the cancel coil 30 and is preferably located concentric with the transmit coil 22 and cancel coil 30, although this is not absolutely essential. It is important, however, that the receive coil 34 have substantially zero inductive coupling with the combined fields of the transmit coil 22 and the cancel coil 30 when the search head is oriented in its normal attitude and effectively separated from conductive and magnetic material.

The dimensions of the receive coil 34 are determined by the desired operating characteristics of the search head. To gain sensitivity in initially detecting an object the receive coil should be relatively large, and to increase the ability of the detector to precisely indicate the location of an object the size of the receive coil should be reduced. Referring to FIG. 3, a trigger conductor 42 may be used to provide a suitable phase reference from the transmitter signal generator to the detection circuit 40. Such a reference connection between the transmit and the detection circuit provides a means of determining relative phase information to identify the object which has produced a response detectable with the receive coil 34.

In operation of the metal detector 10 the signal generator 26 provides an alternating current of a desired frequency which energizes both the transmit coil 22 and the cancel coil 30, producing opposing alternating magnetic fields surrounding the transmit coil 22 and the cancel coil 30. Typically, such a signal generator would provide an unmodulated sine wave voltage to the search head. The resulting continuously changing magnetic flux field surrounding the search head induces fluctuating eddy currents in desirable targets such as conductive metal coins, jewelry and the like. These eddy currents are surrounded by magnetic fields which are sensed by the receive coil as a departure from the previously existing balance between the magnetic field of the transmit coil and that of the cancel coil, thus inducing a current in the receive coil. The hysteresis of magnetic nonconductive objects, as magnetic dipoles rotate in response to the varying field of the transmit coil, also alters the balance between the fields of the transmit and cancel coils and the receive coil and creates a net inductive linkage with the receive coil. The voltage response induced in the receive coil by this imbalance may then be detected by the detection circuit 40, which may be made capable of determining the phase relationship between the transmit signal produced by the signal generator 26 and the response induced in the receive coil 34, and by processing this information may provide an indication of the identity of the object which has caused the response.

Since the responses produced in the receive coil 34 by commonly desirable objects have characteristic phase relationships to the signal applied to the transmit coil, these phase characteristics being different from the characteristics of the responses produced by the presence of magnetic mineral fragments and common undesirable metal objects distributed within the soil, suitable circuitry may be used to reject the responses produced by magnetic material and undesired metal objects.

A desirable target, such as a coin 56 located near the surface of the soil over which the detector head is positioned, produces, because of its proximity to the search head, a stronger response signal in the receive coil 34 than does a coin 58 separated from the search head by a greater depth. Additionally, a coin located as is the coin 60 close to the surface and close to the center of the detector head produces an even stronger signal in the receive coil.

Using a search head embodying the coil arrangement of the invention, the magnetic field of the transmit coil, indicated by the broken outline 62 in FIG. 1, is opposed by the field produced by the cancel coil 30, indicated by the broken outline 64. Thus, within the effective field of the cancel coil 30, the field of the transmit coil 22 is opposed, which results in a net field strength which is less than what would otherwise be produced by the transmit coil alone. Consequently, the detection circuit 40 is subjected to a smaller signal in response to a coin 60 than would be the case without the cancel coil 30. By use of a cancel coil 30 of an appropriate size, number of turns, and location relative to the transmit coil 22, the net magnetic flux density close to the bottom of the search head may be made to increase considerably less steeply between the periphery and the center of the enclosed area of the transmit coil than is the case without the presence of such a cancel coil. At the same time, placement of the cancel coil higher than the transmit coil provides less cancel coil effect on deep objects, and results in a net reduction of sensitivity of the search head to targets in a location such as that of the coin 60 without significantly reducing sensitivity to deep targets such as the coin 58.

The diameter of the cancel coil should preferably be nearly as great as that of the transmit coil if a search head embodying the invention is to be used with detection circuitry capable of rejecting receive coil response to distributed mineral particles in the soil. Since the phase of the response of an object, as sensed by the receive coil, is affected by close proximity of the object to either the transmit coil 22 or the cancel coil 30, having the cancel coil closer to the transmit coil provides balance between the opposing effects of the coils over a greater portion of the area within the transmit coil, providing a larger area in which the phase angle of response signals provides an accurate indication of target object identity. It has been determined empirically that the effective depth range of a coil is approximately equal to the diameter of the coil, and for that reason placement of a cancel coil whose diameter is nearly equal to that of the transmit coil with which it is associated in a higher plane than the transmit coil provides a shell-like zone outside the effective field of the cancel coil and within the effective field of the transmit coil, within which objects are subjected to a field only slightly altered from the field of a transmit coil absent any cancel coil. Within the effective field of the cancel coil 30, the combined field strength increases with reduction in distance from the center of the transmit coil, but at a rate reduced by the presence of the opposing field of the cancel coil 30. By selection of an appropriate number of conductor turns of the cancel coil 30 the maximum search head sensitivity immediately below the search head may be limited to a value which will not overload the detection circuit.

As shown in FIG. 4, corresponding in scale to the dimension of the search head shown in FIG. 2, the horizontal axis representing horizontal distance from the central axis of the transmit coil, magnetic flux distribution immediately below the search head may be characterized by a negative field extending a slight distance beyond the periphery of the transmit coil, an area of reinforced positive magnetic flux density between the transmit coil and the cancel coil, an annular zone of reduced flux density, or possibly negative polarity just within the cancel coil, and a net magnetic flux density further with the cancel coil which increases at a more gradual rate than would be the case without the cancel coil. At a deeper level corresponding to the horizontal line 68 in FIG. 1, the magnetic flux at the same instant, as shown in FIG. 5, gradually increases from a negligible amount at the periphery of the search head to maximum strength immediately below the center of the search head.

In a metal detector including detector circuits which distinguish between various metallic objects by the use of relative phase information, the magnetic flux distribution shown in FIG. 4 may cause problems in identification of targets in positions such as the coin 56. Such a target would experience phase reversals in the combined or net magnetic field near the points 70 and 72 shown in FIGS. 4 and 8, corresponding to the limits of a ring-like region of opposite polarity just inside the cancel coil, and the resulting responses could cause confusion of the target identification circuitry. The utilization of a load coil 44, located in proximity to the cancel coil, between the cancel coil and the transmit coil, can significantly reduce the response produced by an object close to the search head in the zone of influence of the load coil, in a position such as that of the coin 56 between the transmit coil and the cancel coil.

Referring now to FIG. 6, a search head 12' is shown which also comprises a closed loop load coil 44 located between a transmit coil 22' and a cancel coil 30'. The load coil 44 is comprised of a number of turns of a conductor and has an arcuate concave side 46, an arcuate convex side 58 which is a segment of an arc concentric with the concave side, both of which preferably are also concentric with the cancel coil, and a pair of arcuate end portions 50 interconnecting the convex and concave sides to form a closed loop electrically insulated from both the transmit coil 22' and the cancel coil 30'. A suitable resistor 52 may be included in series in the loop, depending on the desired characteristic effect of the load coil in response to a magnetic conductive object.

Referring to FIG. 7, it may be seen that at a given moment the current $i_1$ in a segment of the conductor of the transmit coil 22' is in the opposite direction from the current $i_2$ in a parallel segment of the cancel coil 30' because of the opposing directions of winding of the transmit coil 22' and the cancel coil 30'. Thus at any particular time the magnetic flux $\Phi$ surrounding the conductors of the transmit coil and the cancel coil, as seen by the load coil, produces a net adding effect within the perimeter of the load coil 44. The current induced in the load coil in turn produces a magnetic field in opposition to the net field of the transmit and cancel coils, in effect "short circuiting" that field in a limited area. This effect may also be obtained by use of an appropriately shaped piece of conductive material such as a small cooper plate similarly located, in which eddy currents provide the desired inductive loading.

It has been empirically determined that the effective range of effect of such a load coil is approximately equal to the distance between the conductors on opposite sides of the load coil, that is, approximately equal to the distance between the concave side 46 and the convex side 48 of a load coil such as load coil 52, or the width of a similarly-shaped load plate.

The effect of such a load coil may be tailored to the needs of the particular instrument by variation of its position relative to the cancel coil, the amount of separation between the side conductors 46 and 48 of the load coil, and the number of turns of conductor forming the load coil loop. A load coil which encloses a greater total area gives greater opposition to the net field created by the current in the transmit and cancel coils. Variation of the number of turns and the amount of resistance in the load coil may be used to control the phase relationship between the transmit coil and the net magnetic field within the influence of the load coil, thus shifting the phase of the response of a target within the zone of influence of the load coil to allow detection circuitry to evaluate the response to a target more effectively. Use of a greater number of turns of conductor or a higher resistance in the load coil reduces the phase shift produced by the load coil, while reduction of the resistance and the number of turns of the load coil increases the phase shift of the response to an object close to the load coil.

By properly choosing the parameters of size, resistance, number of turns, and the location of one or more load coils relative to the cancel coil, the load coils can be used to eliminate the opposite-phase areas of the magnetic field beneath the search head particularly those which may be present in close proximity to the cancel coil conductors, to produce a magnetic field distribution similar to that illustrated in the right hand portion of FIG. 8. Preferably, the total area contained within the load coil, or a plurality of load coils distributed around a cancel coil, is kept to a small fraction of the total area within the transmit coil, thus keeping the total field strength reduction produced by the load coil or coils small enough not to interfere with detection and classification of targets.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An inductor coil system for a search head of a metal detector having an electrical detection circuit for indicating the proximity of a metal object, said system comprising:
    (a) planar transmit coil means located in a first plane for producing a first time-varying magnetic field, said transmit coil means including a current path enclosing a first surface through which the magnetic flux of said first magnetic field passes;
    (b) planar cancel coil means of smaller size than said transmit coil means for producing a second time-varying magnetic field in opposition to said first time-varying magnetic field, said cancel coil means including a current path enclosing a second surface through which the magnetic flux of said second magnetic field passes, said cancel coil means being located in a plane parallel to that of said transmit coil means, a portion of said magnetic flux of said first magnetic field also passing through said second surface; and
    (c) planar receive coil means of smaller size than said cancel coil means for producing a magnetically-induced electric receive signal, said receive coil means including a current path enclosing a third surface, a portion of said magnetic flux of said first magnetic field also passing through said third surface, and a portion of said magnetic flux of said second magnetic field also passing through said third surface, said first and second magnetic fields inducing opposing voltages in said receive coil means, said receive coil means being electrically connected to said detection circuit.

2. The coil system of claim 1 wherein said cancel coil means and said receive coil means are located in planes on opposite respective sides of the plane of said transmit coil means.

3. The coil system of claim 1 wherein said receive coil means is disposed at a location, relative to said transmit and cancel coil means, wherein movement thereof in any direction would cause an increase in said receive signal amplitude.

4. The coil system of claim 1 wherein said receive coil means is disposed at a location wherein, in the absence of a proximate conductive or magnetic object, said receive signal amplitude is substantially zero.

5. The coil system of claim 1 wherein said transmit, cancel and receive coil means each comprise annular-shaped coils, the outside radius of the cancel coil being less than the inside radius of said transmit coil, and the outside radius of said receive coil being less than the inside radius of said cancel coil.

6. The coil system of claim 5 wheren said transmit, cancel and receive coils are disposed coaxial with one another in respective parallel planes.

7. The coil system of claim 5 wherein said transmit coil is disposed closer than said cancel coil and said receive coil is disposed closer than said transmit coil to a predetermined location to be searched by said coil system.

8. The coil system of claim 1 wherein said transmit and cancel coil means comprise respective coils electrically connected in magnetic opposition to one another.

9. The coil system of claim 8 wherein, in the absence of a proximate conductive or magnetic object, at any point below said search head the magnetic field intensity produced by said transmit coil means is no less than the magnetic field intensity at the same point produced by said cancel coil means.

10. The coil system of claim 1 further comprising electrically conductive load means inductively coupled to said transmit coil means and said cancel coil means for altering the receive signal produced by said receive coil means in response to the proximity of a conductive or magnetic object within a predetermined zone relative to said search head.

11. The coil system of claim 10 wherein said load means comprises a closed conductor loop.

12. The coil system of claim 10 wherein said load coil means comprises a plate of conductive material.

13. The coil system of claim 1 further comprising conductive load means for altering the receive signal produced by said receive coil means in response to the proximity of a conductive or magnetic object in a predetermined zone relative to said search head, said load means comprising a current path enclosing a fourth surface, a portion of the magnetic flux of said first time-varying magnetic field and a portion of the magnetic flux said second time-varying magnetic field passing through said fourth surface.

14. The coil system of claim 13 wherein said load means is so located with respect to said transmit coil means and said cancel coil means such that said first time-varying magnetic field and said second time-varying magnetic field induce voltages of like polarity in said load means.

* * * * *

UNITED STATES PATENT AND TRADEMARK OFFICE
CERTIFICATE OF CORRECTION

PATENT NO. : 4,255,711
DATED : March 10, 1981
INVENTOR(S) : Fredrick H. Thompson It is certified that error appears in the above-identified patent and that said Letters Patent are hereby corrected as shown below:

| | | |
|---|---|---|
| Col. 1, | line 33 | Change "it" to --It--. |
| Col. 2, | line 2 | Change "coils" to --coins--. |
| | line 45 | No new paragraph |
| Col. 6, | line 2 | After "that" insert --of--. |
| | line 45 | After "load" insert --coil--. |
| Col. 10, | line 44 | Change "with" to --within--. |
| Col. 11, | line 30 | Change "cooper" to --copper--. |
| Col. 14, | line 15 | After "flux" insert --of--. |

Signed and Sealed this

Third Day of November 1981

[SEAL]

Attest:

GERALD J. MOSSINGHOFF

*Attesting Officer*          *Commissioner of Patents and Trademarks*